(12) United States Patent
Bresch et al.

(10) Patent No.: US 7,702,649 B1
(45) Date of Patent: Apr. 20, 2010

(54) OBJECT-RELATIONAL MAPPING SYSTEM AND METHOD FOR GENERIC RELATIONSHIPS

(75) Inventors: Stefan Bresch, Offenburg (DE); Michael Watzek, Berlin (DE); Christian Stork, Boenen (DE); Markus Kuefer, Heidelberg (DE)

(73) Assignee: SAP AG, Walldorf (DE)

( * ) Notice: Subject to any disclaimer, the term of this patent is extended or adjusted under 35 U.S.C. 154(b) by 254 days.

(21) Appl. No.: 10/864,185

(22) Filed: Jun. 8, 2004

(51) Int. Cl.
*G06F 7/00* (2006.01)
*G06F 17/00* (2006.01)
(52) U.S. Cl. .............................. 707/103 Y; 707/103 R
(58) Field of Classification Search .............. 707/103 Y, 707/103 R
See application file for complete search history.

(56) References Cited

U.S. PATENT DOCUMENTS 6,163,776 A   12/2000  Periwal
6,163,781 A * 12/2000  Wess, Jr. .................. 707/103 X

OTHER PUBLICATIONS

Core Java Data Objects, Sameer Tyagi, Keiron McCammon, Michael Vorburger, Heiko Bobzin; Sep. 11, 2003; Chapter/Section: Foreword, 1.3, 2.2, 2.3, 2.5, 3.9, 5.1, 9.5, 13.1.*
Core Java Data Objects, Sameer Tyagi, Published Sep. 11, 2003; Chapter/Section: 2.4 pp. 1-4.*
Ragae Ghaly and Krishna Kothapalli, "SAMS Teach Yourself EJB in 21 Days", 2003, pp. 353-376.
DAVID HAYDEN, "LINQ to SQL Discriminator Column Example —Inheritance Mapping Tutorial", David Hayden Blog, http://davidhayden.com/blog/dave/archive/2007/10/26/LINQToSQLInheritanceDiscriminatorColumnExampleInheritanceMappingTutorial.aspx, pp. 1-3, printed Aug. 12, 2008.
Java™ 2 Platform Std. Ed. v1.4.2, "Interface Collection", java.sun.com/j2se/.../collection.html, pp. 1- 10, printed on Jan. 21, 2009.
Java™ 2 Platform Std. Ed. v1.4.2, "Interface Map", http://java/sun/com/j2se/1.4.2/docs/api/java/util/ map.html, pp. 1-8, printed on Jan. 21, 2009.

* cited by examiner

*Primary Examiner*—Shahid A Alam
*Assistant Examiner*—Alex Gofman
(74) *Attorney, Agent, or Firm*—Blakely Sokoloff Taylor & Zafman LLP

(57) ABSTRACT

A system and method are described for performing a mapping between persistent data objects and a database. For example, a method according to one embodiment of the invention comprises determining whether an attribute having a generic type is an instance of a persistent class; and if the attribute is an instance of a persistent class, then mapping the attribute to a discriminator column holding the type associated with the attribute and further mapping the attribute to a reference column holding a key associated with the attribute.

17 Claims, 16 Drawing Sheets

```xml
<?xml version="1.0" encoding="UTF-8"?>
<!DOCTYPE ejb-jar PUBLIC "-//Sun Microsystems, Inc.//DTD Enterprise JavaBeans
2.0//EN" "http://java.sun.com/dtd/ejb-jar_2_0.dtd">
<ejb-jar>
      <description>EJB JAR description</description>
      <display-name>EJB JAR</display-name>
      <enterprise-beans>
            <entity>
   401            <ejb-name>OrderBean</ejb-name>
                  <home>shopping.OrderHome</home>
                  <remote>shopping.Order</remote>
                  <local-home>shopping.OrderLocalHome</local-home>
                  <local>shopping.OrderLocal</local>
                  <ejb-class>shopping.OrderBean</ejb-class>
                  <persistence-type>Container</persistence-type>
                  <prim-key-class>java.lang.Integer</prim-key-class>
                  <reentrant>False</reentrant>
                  <cmp-version>2.x</cmp-version>
                  <abstract-schema-name>OrderBean</abstract-schema-name>
   410            <cmp-field>
                        <field-name>orderId</field-name>
                  </cmp-field>
   411            <cmp-field>
                        <field-name>orderDate</field-name>
                  </cmp-field>
   412            <cmp-field>
                        <field-name>creditApproved</field-name>
                  </cmp-field>
   413            <cmp-field>
                        <field-name>orederStatus</field-name>
                  </cmp-field>

414            <primkey-field>orderId</primkey-field>
            </entity>
            <entity>
   402            <ejb-name>CustomerBean</ejb-name>
                  <home>shopping.CustomerHome</home>
                  <remote>shopping.Customer</remote>
                  <local-home>shopping.CustomerLocalHome</local-home>
                  <local>shopping.CustomerLocal</local>
                  <ejb-class>shopping.CustomerBean</ejb-class>
                  <persistence-type>Container</persistence-type>
                  <prim-key-class>java.lang.Long</prim-key-class>
                  <reentrant>False</reentrant>
                  <cmp-version>2.x</cmp-version>
                  <abstract-schema-name>CustomerBean</abstract-schema-name>
                  <cmp-field>
                        <field-name>ssn</field-name>
                  </cmp-field>
                  <cmp-field>
                        <field-name>age</field-name>
                  </cmp-field>
```

Fig 4a
(prior art)

```xml
            <cmp-field>
                    <field-name>firstName</field-name>
            </cmp-field>
            <cmp-field>
                    <field-name>lastName</field-name>
            </cmp-field>
            <primkey-field>ssn</primkey-field>
    </entity>
    <entity>
            <ejb-name>ProductBean</ejb-name>
            <home>shopping.ProductHome</home>
            <remote>shopping.Product</remote>
            <local-home>shopping.ProductLocalHome</local-home>
            <local>shopping.ProductLocal</local>
            <ejb-class>shopping.ProductBean</ejb-class>
            <persistence-type>Container</persistence-type>
            <prim-key-class>java.lang.String</prim-key-class>
            <reentrant>False</reentrant>
            <cmp-version>2.x</cmp-version>
            <abstract-schema-name>ProductBean</abstract-schema-name>
            <cmp-field>
                    <field-name>name</field-name>
            </cmp-field>
            <cmp-field>
                    <field-name>productId</field-name>
            </cmp-field>
            <cmp-field>
                    <field-name>price</field-name>
            </cmp-field>
            <primkey-field>productId</primkey-field>
    </entity>
</enterprise-beans>
<relationships>
    <description>
    </description>
    <ejb-relation>
            <description>description</description>
            <ejb-relation-name>Order-Customer</ejb-relation-name>
            <ejb-relationship-role>
                    <ejb-relationship-role-name>shopping.OrderBean</ejb-relationship-role-name>
                    <multiplicity>One</multiplicity>
                    <relationship-role-source>
                            <ejb-name>OrderBean</ejb-name>
                    </relationship-role-source>
                    <cmr-field>
                            <cmr-field-name>customer</cmr-field-name>
                    </cmr-field>
            </ejb-relationship-role>
            <ejb-relationship-role>
```

Fig 4b
(prior art)

```
                <ejb-relationship-role-name>shopping.CustomerBean</ejb-
                relationship-role-name>
              ┌─<multiplicity>Many</multiplicity>
         431/   <relationship-role-source>
                    <ejb-name>CustomerBean</ejb-name>
                </relationship-role-source>
            </ejb-relationship-role>
        </ejb-relation>

┌─<ejb-relation>
     /      <description>description</description>
  407       <ejb-relation-name>Order-Product</ejb-relation-name>
            <ejb-relationship-role>
                <ejb-relationship-role-name>shopping.OrderBean</ejb-
                relationship-role-name>
                <multiplicity>Many</multiplicity>
                <relationship-role-source>
                    <ejb-name>OrderBean</ejb-name>
                </relationship-role-source>
                <cmr-field>
                    <cmr-field-name>products</cmr-field-name>
                    <cmr-field-type>java.util.Collection</cmr-field-type>
                </cmr-field>
            </ejb-relationship-role>
            <ejb-relationship-role>
                <ejb-relationship-role-name>shopping.ProductBean</ejb-
                relationship-role-name>
                <multiplicity>Many</multiplicity>
                <relationship-role-source>
                    <ejb-name>ProductBean</ejb-name>
                </relationship-role-source>
            </ejb-relationship-role>
        </ejb-relation>
    </relationships>
</ejb-jar>
```

Fig 4c
(prior art)

*Persistence Management State Transitions*

| Column | JDBC type |
|---|---|
| Discriminator | CHAR, VARCHAR, LONGVARCHAR |
| Count | INTEGER |
| Reference | CHAR, VARCHAR, LONGVARCHAR, VARBINARY, LONGVARBINARY |
| Serialized Data | BLOB |

*Fig. 14*

OBJECT-RELATIONAL MAPPING SYSTEM AND METHOD FOR GENERIC RELATIONSHIPS

BACKGROUND

1. Field of the Invention

This invention relates generally to the field of data processing systems. More particularly, the invention relates to a system and method for mapping persistent data objects to a database.

2. Description of the Related Art

Multi-Tier Enterprise Systems

Java 2 Enterprise Edition ("J2EE") is a specification for building and deploying distributed enterprise applications. Unlike traditional client-server systems, J2EE is based on a multi-tiered architecture in which server side program code is divided into several layers including a "presentation" layer and a "business logic" layer.

FIG. 1 illustrates an exemplary J2EE application server 100 in which the presentation layer is implemented as a Web container 111 and the business layer is implemented as an Enterprise JavaBeans ("EJB") container 101. Containers are runtime environments which provide standard common services 119, 109 to runtime components. For example, the Java Naming and Directory Interface ("JNDI") is a service that provides application components with methods for performing standard naming and directory services. Containers also provide unified access to enterprise information systems 117 such as relational databases through the Java Database Connectivity ("JDBC") service, and legacy computer systems through the J2EE Connector Architecture ("JCA") service. In addition, containers provide a declarative mechanism for configuring application components at deployment time through the use of deployment descriptors (described in greater detail below).

As illustrated in FIG. 1, each layer of the J2EE architecture includes multiple containers. The Web container 111, for example, is itself comprised of a servlet container 115 for processing servlets and a Java Server Pages ("JSP") container 116 for processing Java server pages. The EJB container 101 includes three different containers for supporting three different types of enterprise Java beans: a session bean container 105 for session beans, an entity bean container 106 for entity beans, and a message driven bean container 107 for message driven beans. A more detailed description of J2EE containers and J2EE services can be found in RAGAE GHALY AND KRISHNA KOTHAPALLI, SAMS TEACH YOURSELF EJB IN 21 DAYS (2003) (see, e.g., pages 353-376).

Persistence and Enterprise Java Beans

The information systems of a modern day enterprise (such as a corporation or government institution) are often responsible for managing and performing automated tasks upon large amounts of data. Persistent data is that data that "exists" for extended periods of time (i.e., it "persists"). Persistent data is typically stored in a database so that it can be accessed as needed over the course of its existence. Here, complex database software (e.g., such as DB2, Oracle, and SQL Server) is often used to read the data and perhaps perform various intelligent functions with it. Frequently, persistent data can change over the course of its existence (e.g., by executing a series of reads and writes to the data over the course of its existence). Moreover, multiple items of different persistent data may change as part of a single large scale "distributed transaction."

FIG. 2 illustrates the manner in which persistent data is managed in current J2EE environments. Session beans 255-257 comprise the high level workflow and business rules implemented by the application server 100. For example, in a customer relationship management ("CRM") system, session beans define the business operations to be performed on the underlying customer data (e.g., calculate average customer invoice dollars, plot the number of customers over a given timeframe, . . . etc).

Session beans typically execute a single task for a single client during a "session." Two versions of session beans exist: "stateless" session beans and "stateful" session beans. As its name suggests, a stateless session bean interacts with a client without storing the current state of its interaction with the client. By contrast, a stateful session bean stores its state across multiple client interactions.

Entity beans are persistent objects which represent data (e.g., customers, products, orders, . . . etc) stored within a database 223. Typically, an entity bean 252 is mapped to a table 260 in the relational database and, as indicated in FIG. 2, each "instance" of the entity bean is typically mapped to a row in the table (referred to generally as an "object-relational mapping"). Two different types of persistence may be defined for entity beans: "bean-managed persistence" and "container-managed persistence." With bean-managed persistence, the entity bean designer must provide the code to access the underlying database (e.g., SQL Java and/or JDBC commands). By contrast, with container-managed persistence, the EJB container 101 manages the underlying calls to the database.

Entity Bean Deployment

A "deployment descriptor" is an XML file (named "ejb-jar.xml") that describes how entity beans are deployed within the J2EE application server 100. For each CMP entity bean, the deployment descriptor defines "persistent fields" which represent and store a single unit of data, and "relationship" fields which represent and store references to other entity beans. Relationship fields are analogous to foreign keys used in relational database tables. Relationships between entity beans may be defined as "one-to-one" where each entity bean is associated with a single instance of another entity bean, "one-to-many" where each entity bean is associated with many instances of another entity bean, or "many-to-many" where entity bean instances may be related to multiple instances of each other.

An exemplary object model of three entity beans is illustrated in FIG. 3 and an exemplary deployment descriptor describing the three entity beans is illustrated in FIGS. 4a-c. The entity beans include a product entity bean 303 representing one or more products, an order entity bean 301 representing a business order and a customer entity bean 302 representing a customer. As indicated in FIG. 3, a many-to-many relationship exists between the product bean 303 and the order bean 301 (i.e., many different product may be used in many different orders). Similarly, a one-to-many relationship exists between the customer bean 302 and the order bean 301 (i.e., an individual customer may make multiple orders).

The container-managed persistence ("CMP") fields of the product bean 303 include product Name, Product ID, and Price (identifying the name product identification code and price, respectively, of each product). The CMP fields for the order bean 301 include Order ID, Order Date, Credit Approved (indicating whether the user's credit card company approved the order) and Order Status; and the CMP fields for the customer bean 302 include social security number (SSN), Age, First Name and Last Name of the customer.

The deployment descriptor illustrated in FIGS. 4a-c includes separate sections 401-403 representing and describing the CMP fields for each entity bean 301-303, respectively. For example, section 401 includes four entries 410-413 (identified by the <cmp-field> XML tags) identifying each of the order entity bean's CMP fields (i.e., Order ID, Order Date, Credit Approved, and Order Status). Entity bean sections 402-403 include similar entries identifying CMP fields. In addition, for each entity bean, one particular CMP field is identified as the primary key field using the <primkey-field> tag 414-416 (e.g., Order ID for the order bean 301).

A <relationships> section 405 of the deployment descriptor (see FIG. 4b) defines the relationships between each of the entity beans 301-303. Each entity bean relationship is defined under a separate <ejb-relation> tag 406, 407. For example, the one-to-many relationship between the order bean 301 and the customer bean 302 is described by setting the <multiplicity> tag 430 associated with the order bean 301 to "many" and setting the <multiplicity> tag 431 associated with the customer bean 302 to "one." Similar descriptions are provided under <ejb-relation> tag 407 to define the many-to-many relationship between the order bean 301 and the product bean 303.

Java Data Objects

Several techniques may be used to provide support for object persistence. The java.io.Serializable interface, for example, provides class programmers a way to explicitly save objects to an output stream (e.g., writing the object's fields to a flat file on a local disk). By contrast, JDBC and SQLJ provide mechanisms for storing and retrieving data objects into a database, in addition to concurrency controls through transactions. However, these techniques all require that the class programmer either be responsible for handling the underlying details of persistence management (or learn a new language to interface with the back end data store).

The Java Data Objects (JDO) specification addresses these issues by providing a higher level abstraction, referred to generally as "transparent persistence." That is, the persistence of data objects can be made automatic and all logic for processing persistent objects may be expressed in pure Java language. In addition to shielding the class developer from the details of the underlying persistence methods, JDO also acts as a standard layer between the application program (e.g., the EJBs) and any back-end data storage, whether it be a database, file system, or other non-volatile memory. Applications utilizing the JDO interface may automatically plug in to any data store which provides a JDO implementation, thereby improving portability and increasing the longevity of the application code.

BRIEF DESCRIPTION OF THE DRAWINGS

A better understanding of the present invention can be obtained from the following detailed description in conjunction with the following drawings, in which:

FIGS. 4a-c illustrates an exemplary deployment descriptor employed within a J2EE environment.

FIG. 14 illustrates columns employed in one embodiment of the invention and associated JDBC types.

DETAILED DESCRIPTION OF PREFERRED EMBODIMENTS

Described below is a system and method for mapping generic persistent data types to a relational database. Throughout the description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Note that in this detailed description, references to "one embodiment" or "an embodiment" mean that the feature being referred to is included in at least one embodiment of the invention. Moreover, separate references to "one embodiment" in this description do not necessarily refer to the same embodiment; however, neither are such embodiments mutually exclusive, unless so stated, and except as will be readily apparent to those skilled in the art. Thus, the invention can include any variety of combinations and/or integrations of the embodiments described herein.

An Exemplary Application Server Architecture

Figure 1:
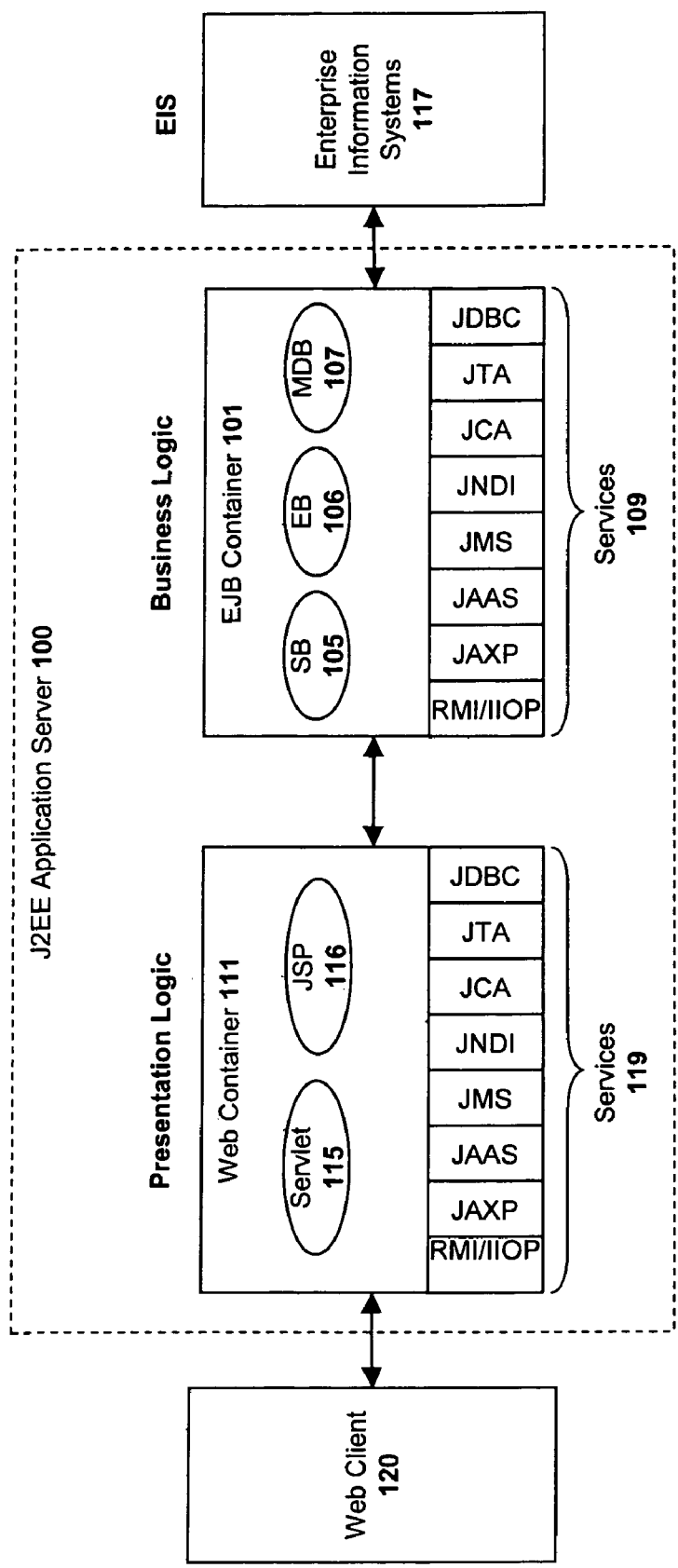
FIG. 1 illustrates several layers within a prior art J2EE architecture.
Figure 2:
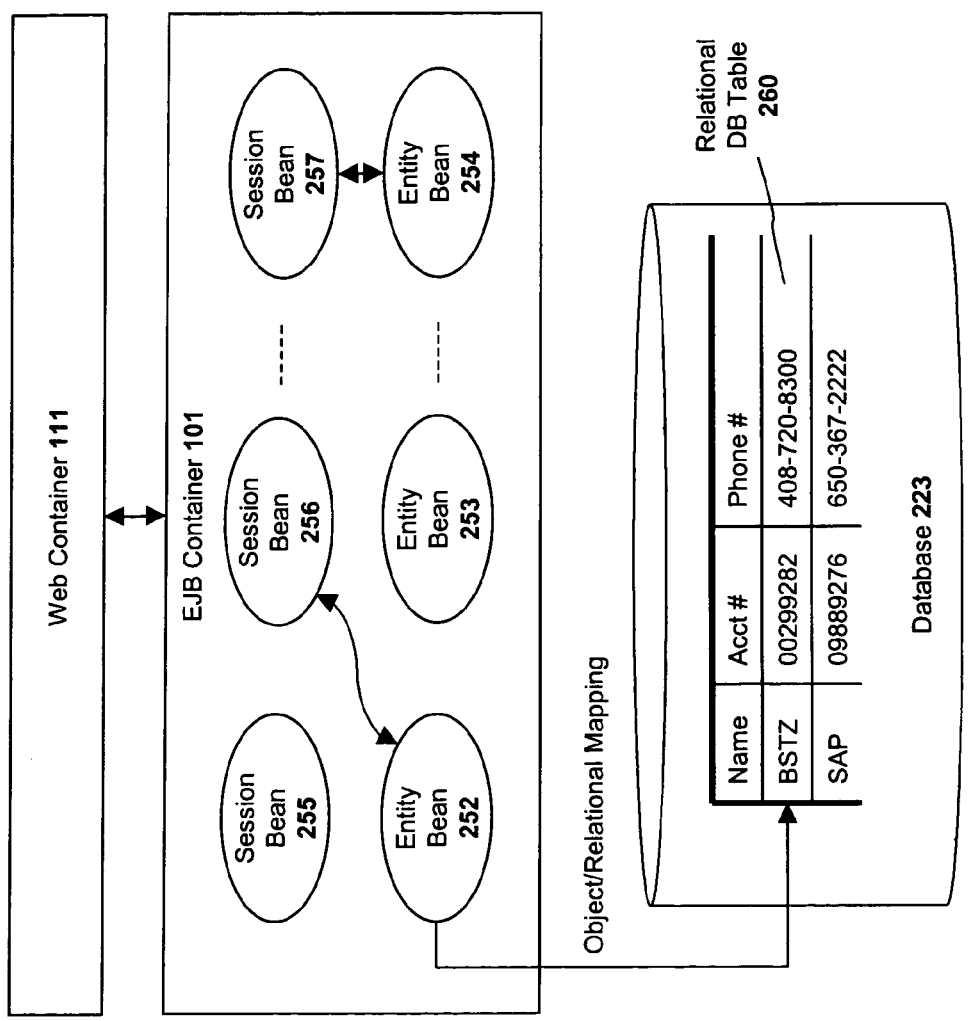
FIG. 2 illustrates an object/relational mapping between an entity bean and a relational database table.
Figure 3:
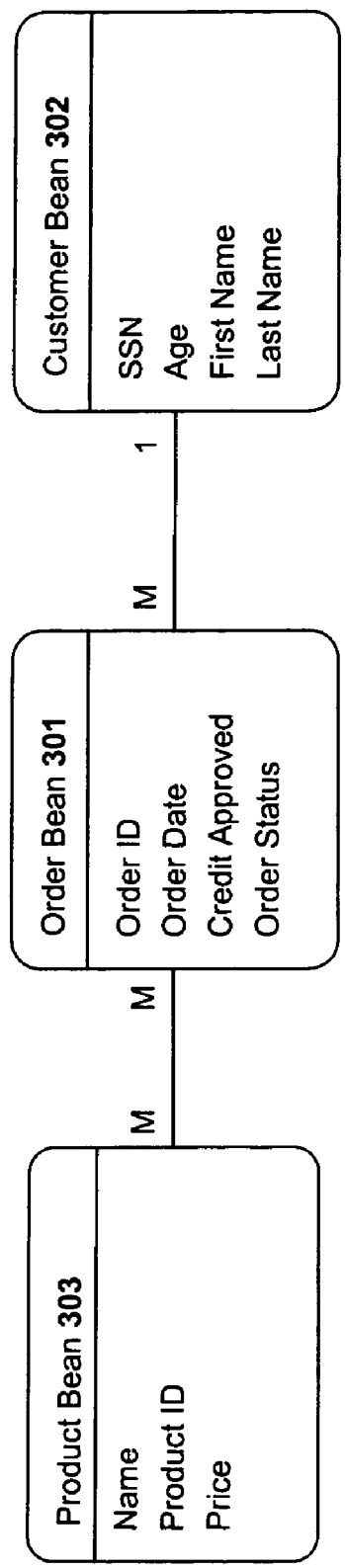
FIG. 3 illustrates an object model of three exemplary entity beans.
Figure 5:
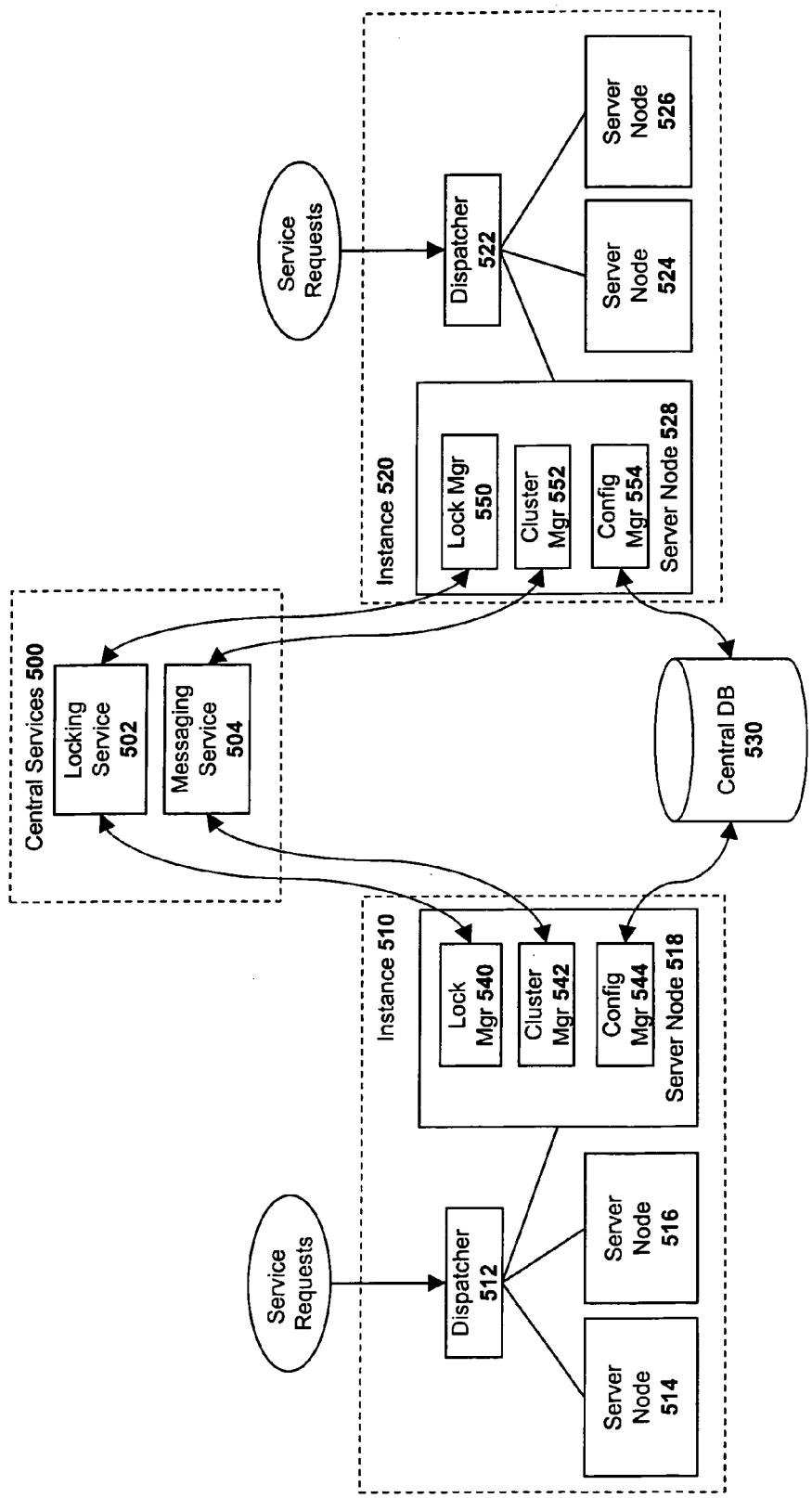
FIG. 5 illustrates a clustered server architecture on which embodiments of the invention are implemented.

A system architecture according to one embodiment of the invention is illustrated in FIG. 5. The architecture includes a central services instance 500 and a plurality of application server instances 510, 520. As used herein, the application server instances, 510 and 520, each include a group of server nodes 514, 516, 518 and 524, 526, 528, respectively, and a dispatcher 512, 222, respectively. The central services instance 500 includes a locking service 502 and a messaging service 504. The combination of all of the application instances 510, 520 and the central services instance 500 is referred to herein as a "cluster." Although the following description will focus solely on instance 510 for the purpose of explanation, the same principles apply to other instances such as instance 520.

The server nodes 514, 516, 518 within instance 510 are used to implement business logic and presentation logic. Each of the server nodes 514, 516, 518 within a particular instance 510 may be configured with a redundant set of application logic and associated data. In one embodiment, the dispatcher 512 distributes service requests from clients to one or more of the server nodes 514, 516, 518 based on the load on each of the servers. For example, in one embodiment, the dispatcher 512 implements a round-robin policy of distributing service requests.

In the description that follows, the server nodes 514, 516, 518 are Java 2 Enterprise Edition ("J2EE") server nodes which support Enterprise Java Bean ("EJB") components and EJB containers (at the business layer) and Servlets and Java Server Pages ("JSP") (at the presentation layer). Of course, the embodiments of the invention described herein may be implemented in the context of various different software platforms including, by way of example, Microsoft .NET platforms and/or the Advanced Business Application Programming ("ABAP") platforms developed by SAP AG, the assignee of the present application.

In one embodiment, communication and synchronization between each of the instances 510, 520 is enabled via the central services instance 500. As illustrated in FIG. 5, the central services instance 500 includes a messaging service 504 and a locking service 502. The message service 504 allows each of the servers within each of the instances to communicate and stay synchronized with one another via a message passing protocol. For example, messages from one server may be broadcast to all other servers within the cluster via the messaging service 504. Alternatively, messages may be addressed directly to specific servers within the cluster (i.e., rather than being broadcast to all servers). The term "messages" is used broadly here to refer to any type of data communication between the server nodes and dispatchers in the cluster.

In one embodiment, the locking service 502 disables access to (i.e., locks) certain specified portions of data and/or program code stored within a central database 530. Moreover, the locking service 502 enables a distributed caching architecture in which copies of data are cached locally at servers/dispatchers.

In one embodiment, the messaging service 504 and the locking service 502 are each implemented on dedicated servers. However, the messaging service 504 and the locking service 502 may be implemented on a single server or across multiple servers while still complying with the underlying principles of the invention.

As illustrated in FIG. 5, each server node (e.g., 518, 528) includes a lock manager 540, 550 for communicating with the locking service 502; a cluster manager 542, 552 for communicating with the messaging service 504; and a configuration manager 544, 554 for communicating with a central database 530 (e.g., to store/retrieve data as described herein). Although the lock manager 540, 550, cluster manager 542, 552 and configuration manager 544, 554 are illustrated only with respect to server nodes 518 and 528 in FIG. 5, each of the server nodes 514, 516, 524 and 526 and/or on the dispatchers 512, 522 may be equipped with equivalent lock managers, cluster managers and configuration managers.

Embodiments of a Persistence Management Layer

Figure 6:
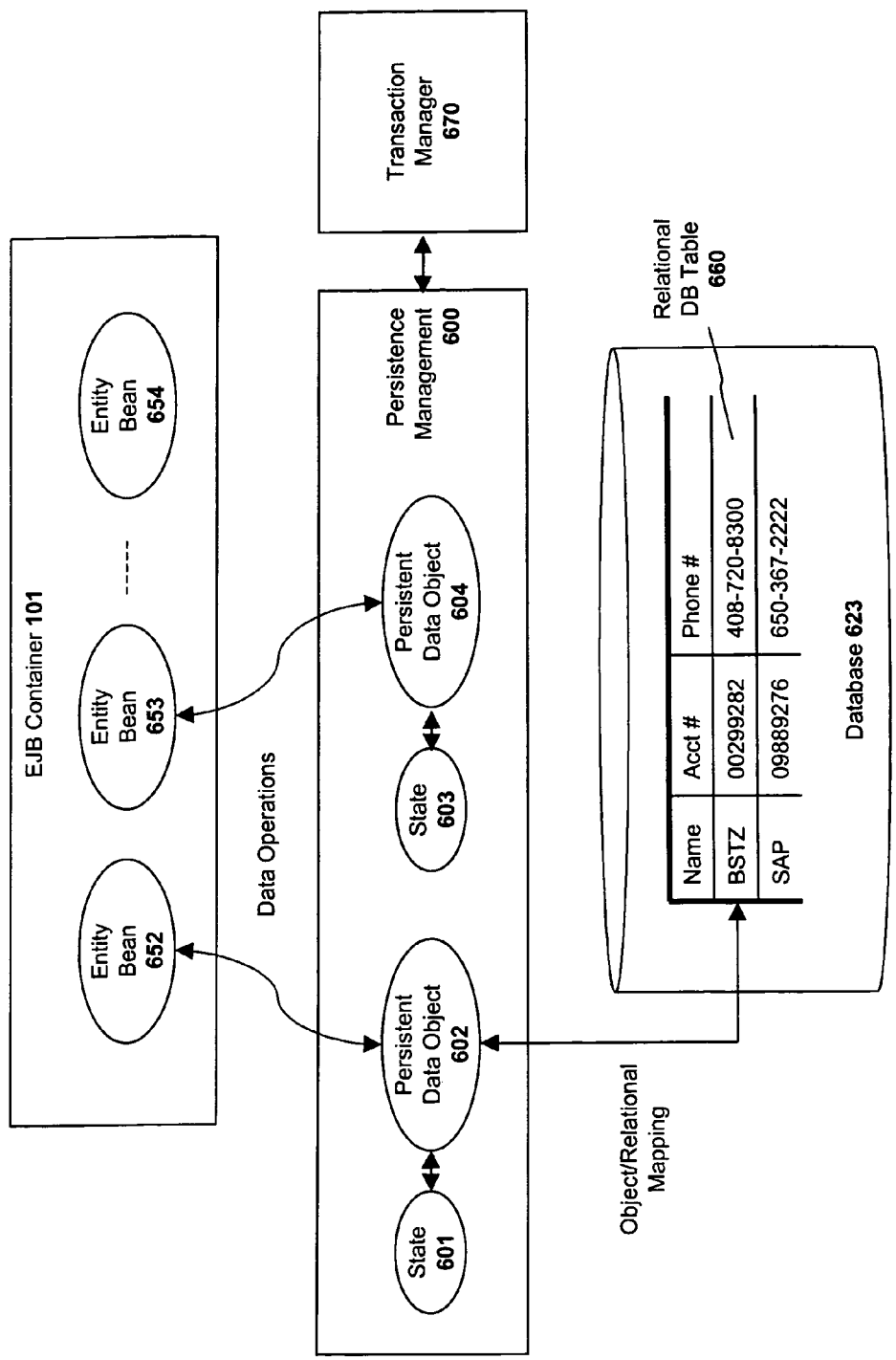
FIG. 6 illustrates a persistence management architecture on which embodiments of the invention may be implemented.

The embodiments of the invention described herein improve the portability and extensibility of enterprise applications by separating the pure business logic (e.g., entity beans and session beans in a J2EE environment) from persistent data objects. FIG. 6 illustrates one embodiment which includes a persistence manager 600 for managing a plurality of persistent data objects 602, 604. The persistent data objects 602, 604 provide an in-memory representation of persistent data stored within a database 623. For example, in one embodiment, each persistent data object 602, 604 contains data from a row in a database table 660.

In a J2EE environment, the EJB containers 101 on the various server nodes 514, 516, 518, 524, 526, 528, interact with the persistence manager 600 through a well-defined interface. In one embodiment, for every container-managed entity bean instance 652-653 activated by the EJB Container 101 in response to a client request, a corresponding persistent data object 602, 604 is created by the persistence manager 600. Unlike a standard J2EE configuration in which each of the entity bean instances contains persistent data from the database, the entity bean instances 652-653 illustrated in FIG. 6 are comprised of only the business methods that manipulate the persistent data (e.g., using abstract get/set methods), and the persistent data itself is stored and managed by the persistence manager 600. In one embodiment, these methods are provided as part of the EJB Container 101.

A persistence manager 600 and associated persistent data objects 602, 604 may be maintained as in an in-memory cache on each server node. While in memory, the data within the persistent data objects 602, 604 may be continually modified in response to business transactions. At some point, however, the persistent data must be committed to the database. As such, in one embodiment of the invention, the persistence manager 600 employs techniques to ensure that the correct database operations are performed when it is time to commit the data to the database. Specifically, in one embodiment, the persistence manager 600 associates a state property 601, 603 with each persistent data object 602, 604, respectively. The state property 601, 603 identifies the database operation to be executed when the data contained within the persistent data object 602, 604 is committed to the database (e.g., via an insert, update, or delete operation)

Figure 7:
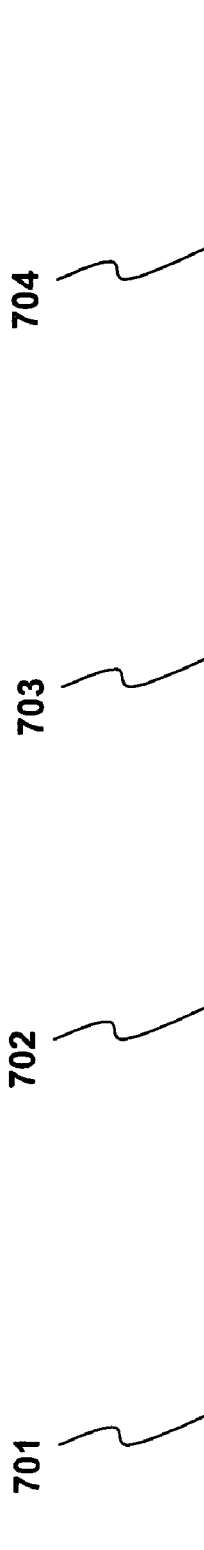
FIG. 7 illustrates a state transition table employed by one embodiment of the persistent management layer.

In one embodiment, the persistence manager 600 manages the state properties 601, 603 associated with each persistent data object 602, 604 according to the state transition table illustrated in FIG. 7. The state of a persistent object implies the operation that must be executed in order to synchronize its data with the database. The initial state of the persistent data object is set forth in column 701; the operations to be performed on the persistent data object are set forth in the top row of columns 702, 703 and 704; and the resulting state of the persistent data objects following each of the operations is set forth in the remaining rows of columns 702, 703 and 704. In one embodiment, the possible values for a persistent object state are as follows:

DEFAULT—The default property is the initial property of the persistent data object. All persistent data objects are in this state before they are affected by a transaction. If this state is preserved until the end of the transaction, this means that the data represented by the object is consistent, that this data is the same as in the database, and no operation is performed in the database.

UPDATED—The "updated" state indicates that the persistent data object has been changed. As such, the data within the database represented by the persistent data object must be synchronized with an "Update" query.

CREATED—The "create" state identifies a newly-created persistent data object. As such, the database must be synchronized with a "Create" query (e.g., a new row will be added to the database).

REMOVED—The "remove" state indicates that the persistent data object has been deleted. As such, the database must be synchronized with a "Remove" query (e.g., removing a row in the database).

VIRTUALLY REMOVED—The "virtually removed" state means the object is first created and then removed by the same transaction. As the "create" operation is performed only within the persistence manager 400 (i.e., within the cache of the server node) and not in the database, at the end of the transaction no operation will be executed to the database. Thus, after the transaction commits, the entity will not exist in the database. The difference from the "default" state is that for the active transaction, the persistent object is removed, and for all other transactions it never existed.

The table in FIG. 7 shows how the persistent object state is changed when a certain operation is performed on the persistent data object. For example, if the persistent data object is in the "default" state, then in response to a create, remove or update operation, the persistent data object will transition to the "created," "removed," or "updated" state respectively. If the persistent data object is in the "updated" or "created" state, then a "create" operation will result in an exception. The "duplicate key" entry indicates that a create operation would result in a duplicate primary key in the database (i.e., thereby rendering the database inconsistent). As is known in the art, a primary key is an attribute or a set of attributes that are unique among the rows of a database table. The table's primary key is used to refer to the rows of the table.

If a persistent data object is in the "created" state and a "remove" operation is performed on the persistent data object, then, as indicated in the table in FIG. 7, the persistent data object will transition to the "virtually removed" state. As mentioned above, when in the "virtually removed" (as opposed to the removed state), no database operation is required at commit time. In addition, when in the virtually removed state, if the persistent data object is once again created, it will transition to the "created" state. For obvious reasons, when in the "virtually removed" state or the "removed" state, there is no possibility of performing a "remove" operation or an "update" operation on the persistent data object.

It should be noted, that the state transition table shown in FIG. 7 is for the purpose of explanation only. Various other/additional state transitions may be implemented while still complying with the underlying principles of the invention.

One advantage of logically separating persistent data objects and pure business processing objects is that it simplifies the application development process (i.e., EJB application developers do not need to worry about database coding or data coherency issues), improves application portability and independence from the underlying physical data storage mechanism, and allows for lightweight, low-cost extensibility of applications. Developers who implement the processing objects (e.g., EJBs) work transparently with the persistent data objects.

At any given time, the same data from the database may be represented by multiple persistent data objects stored in-memory on (potentially) multiple server nodes. Given that the persistent data objects may be independently modified on each server node, one embodiment of the persistence manager 600 employs distributed data processing techniques to ensure the integrity of the in-memory representations of the data prior to each database commit. In one embodiment, a transaction manager 670 (shown in FIG. 6) is used to monitor distributed data transactions spread across multiple server nodes and/or databases. In one embodiment, the transaction manager 670 evaluates the states of each of the persistent data objects to determine whether the transaction should be rolled back or committed to the database. If the same data is concurrently modified on two separate server nodes, for example, the transaction manager 670 may either roll back the transactions and put the data back in the state it was in prior to the transactions, or attempt to resolve the transactions and allow the data to be committed to the database (i.e., allow both transactions to occur as long as the transactions do not conflict with each other). Examples of transaction managers include, but are not limited to, the Java Transaction API ("JTA") that is part of the J2EE platform and the Microsoft Distributed Transaction Coordinator ("MDTC") from Microsoft Corporation.

Techniques for Object-Relational Mapping of Generic Relationships

In one embodiment of the invention, the persistent manager 600 employs techniques for transparently mapping generic relationships to a relational database. Although the embodiments of the invention described below employ a JDO-compliant implementation for mapping persistent data objects, the underlying principles of the invention are not limited to any particular persistence management standard.

As mentioned above, each persistent field of each persistent data object is mapped to a single column or a set of columns within the database. In addition, relationships between persistent data objects are expressed in relationship fields. Relationship fields are fields with persistent class types or fields with collection interface types (such as java.util.Set and java.util.Collection) containing elements of persistent class types.

Depending on the field type there may be one-to-one, one-to-many, many-to-one or many-to-many relations between persistent classes in the object model. In addition, relationships may be unidirectional or bidirectional. A unidirectional relationship can be navigated in only one direction. For example, a "contact" entity bean (representing a contact within an address book) may include a relationship field that refers to an address bean but the address bean may not require a relationship field that refers to the contact bean. By contrast, a bidirectional relationship may be navigated in both directions. For example, an "order" bean may refer to a series of line items and each of the series of line items may refer back to the order (i.e., so that the order may be identified given a particular line item of that order).

The meaning of relations in the relational database model is bound to foreign keys between database tables. The relational model in general differs from the object model. For example, the foreign key for one-to-many relations does not typically belong to the table mapped to the class with the relationship field. As described below, for many-to-many relations, "join" tables may be used to associate the primary keys of one persistent data object with the primary keys of a second persistent data object.

There are seven convenient relationship patterns as combinations of relations in the object model and relations in the relational model.

One-to-Many Bi-Directional Relationships

In a one-to-many bidirectional relationship, a field of set type on the "one" side corresponds to a field of persistence capable type on the "many" side. The element type of the set on the one-side is the type of the persistence capable type on the many-side, the type of the field on the many side is the type of the persistence capable class on the one-side. In the relational model there is a foreign key column in the many-side table referring primary key columns in the one-side table.

Figure 8:
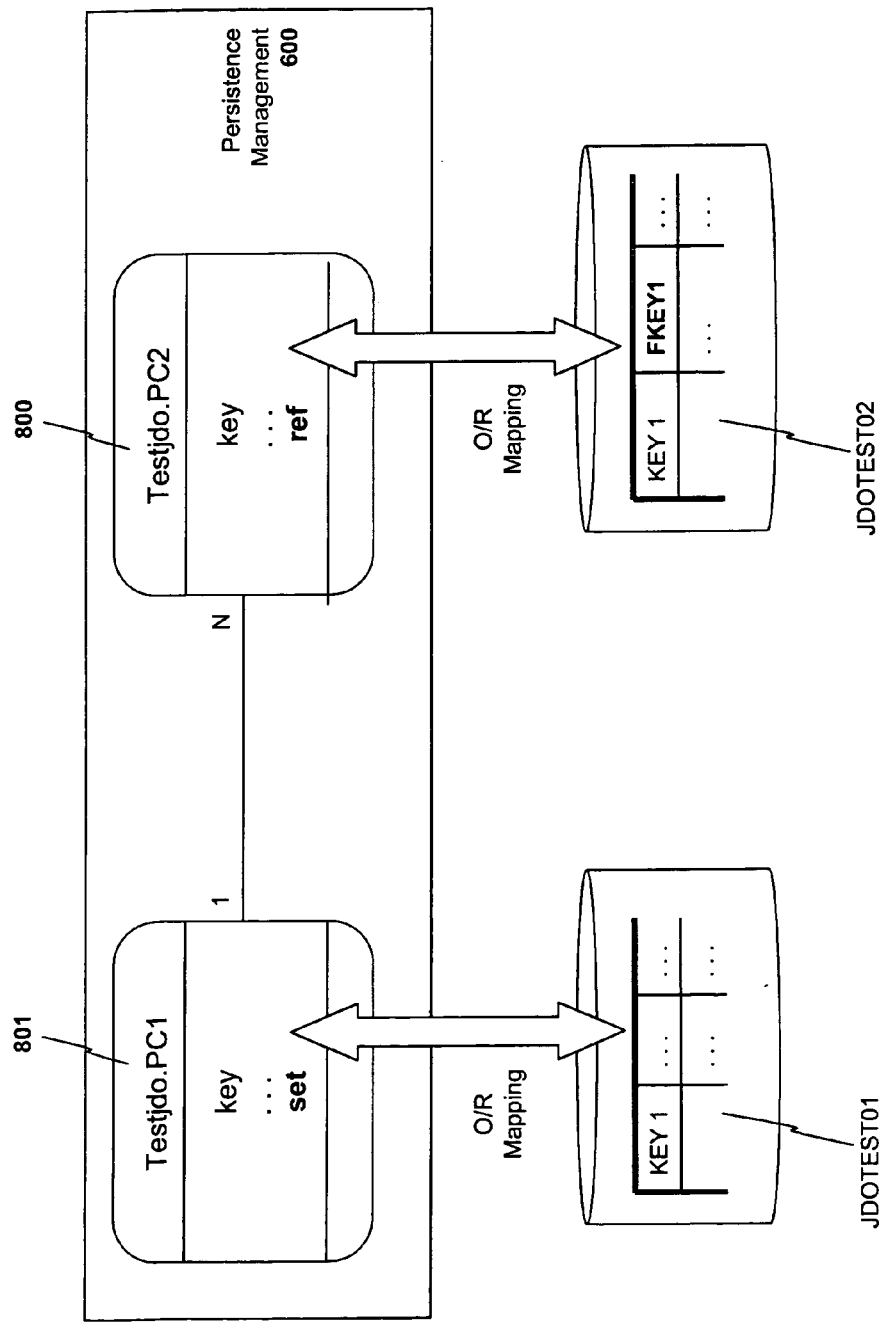
FIG. 8 illustrates a one-to-many bidirectional mapping employed in one embodiment of the invention.

FIG. 8 illustrates one particular example where there is one-to-many relationship between class testjdo.PC1 (801) and class testjdo.PC2 (800). The class testjdo.PC1 has a relationship field set of set type containing elements of type testjdo.PC2. The class testjdo.PC2 has a relationship field ref of type testjdo.PC1. The class testjdo.PC1 is mapped to table JDOTEST01, the class testjdo.PC2 is mapped to table JDOTEST02. In table JDOTEST02 there is a foreign key column FKEY1 with primary key column KEY1 in table JDOTEST01. In the mapping meta data there is a foreign-key element for the both relationship fields set and ref containing the same foreign key (identified by the foreign key name).

In one embodiment of the invention, the following persistence and mapping metadata may be employed to describe the foregoing relationships:

```
<jdo>
  <package name="testjdo">
    <class name="PC1" identity-type="application" objectid-class="PC1$PC1ID">
      <field name="key" persistence-modifier="persistent" primary-key="true"/>
      <field name="set" persistence-modifier="persistent" embedded="false" default-fetch-group="false">
        <collection element-type="PC2" embedded-element="false"/>
      </field>
    </class>
    <class name="PC2" identity-type="application" objectid-class="PC2$PC2ID">
      <field name="key" persistence-modifier="persistent" primary-key="true"/>
      <field name="ref" persistence-modifier="persistent" embedded="false" default-fetch-group="false"/>
    </class>
  </package>
</jdo>

<map version="1.0">
  <package name="testjdo">
    <class name="PC1">
      <field name="key">
        <column name="KEY1" table="JDOTEST01"/>
      </field>
      <relationship-field name="set" multiplicity="many">
        <foreign-key name="JDOTEST02_TO_JDOTEST01" foreign-key-table="JDOTEST02" primary-key-table="JDOTEST01">
          <column-pair foreign-key-column="FKEY1" primary-key-column="KEY1"/>
        </foreignKey>
      </relationship-field>
    </class>
    <class name="PC2">
      <field name="key">
        <column name="KEY1" table="JDOTEST02"/>
      </field>
      <relationship-field name="ref" multiplicity="one">
        <foreign-key name="JDOTEST02_TO_JDOTEST01" foreign-key-table="JDOTEST02" primary-key-table="JDOTEST01">
          <column-pair foreign-key-column="FKEY1" primary-key-column="KEY1"/>
        </foreignKey>
      </relationship-field>
    </class>
  </package>
</map>
```

One-to-Many Unidirectional Relationships

The one-to-many unidirectional relationship differs from the one-to-many bidirectional relation by the missing field of persistence capable class type on the "many" side.

The relational model is essentially the same as the relational model for one-to-many bidirectional relations. Of course, there may be a mapping to a join table, but this table can be treated as another table in the sense of multi table mapping, because one foreign key of the join table can be treated as its primary key and is identical to the primary key on the referring side.

The mapping metadata for the remaining field of set type is the same as the mapping metadata in the one-to-many bidirectional case.

Many-to-One Unidirectional Relationships

The many-to-one unidirectional relationship differs from the one-to-many bidirectional relation by the missing field of set type on the one side. The relational model is the same as the relational model for one-to-many bidirectional relations. This mapping pattern is the straightforward way to map a foreign key that has only to be navigated from the many to the one side.

The mapping metadata for the remaining field of persistence capable class type is the same as the mapping metadata in the one-to-many bidirectional case.

Many-to-Many Bidirectional Relationships

In a many-to-many bidirectional relationship, there are corresponding fields of set type on both sides of the relationship. The element type of the sets is the persistence capable class type of the other side. In the relational model a join table may be employed containing foreign keys to one table of both sides.

Figure 9:
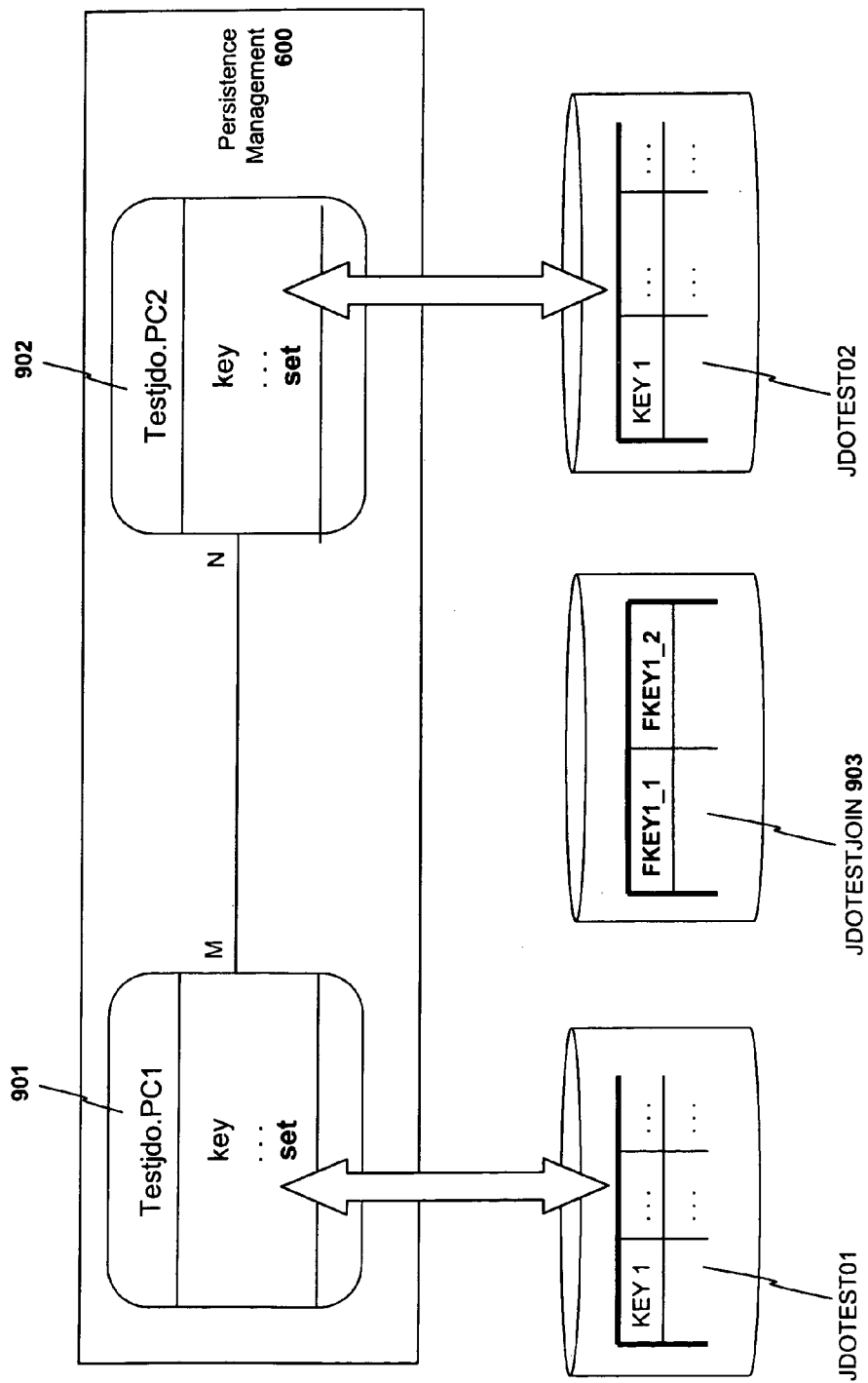
FIG. 9 illustrates a many-to-many bidirectional mapping employed in one embodiment of the invention.

In the example illustrated in FIG. 9, there is many-to-many relationship between the class testjdo.PC1 (901) and class testjdo.PC2 (902). Both classes have a relationship field set of set type containing elements of persistence capable class type of the other side. The class testjdo.PC1 is mapped to table JDOTEST01, the class testjdo.PC2 is mapped to table JDOTEST02. A join table JDOTESTJOIN (903) is provided with foreign key columns FKEY1_1 and FKEY1_2. The column FKEY1_1 is the foreign key column for the primary key KEY1 in table JDOTEST01 and the column FKEY1_2 is the foreign key column for the primary key KEY1 in table JDOTEST02. In the mapping metadata there are two foreign-key elements for both relationship fields set containing the same two foreign keys: one foreign key from the table of the referring class type to the join table, another foreign key from the join table to the table of the referred class type. In one relationship field element, the property update must be set to false. The information on the changes needed in the join table are then extracted from the other relationship field (where update is set to true, which is the default).

In one embodiment of the invention, the following persistence and mapping metadata may be employed to describe the foregoing relationships:

```
<jdo>
  <package name="testjdo">
    <class name="PC1" identity-type="application" objectid-class="PC1$PC1ID">
      <field name="key" persistence-modifier="persistent" primary-key="true"/>
      <field name="set" persistence-modifier="persistent" embedded="false" default-fetch-group="false">
        <collection element-type="PC2" embedded-element="false"/>
```

```
        </field>
      </class>
      <class name="PC2" identity-type="application" objectid-
          class="PC2$PC2ID">
        <field name="key" persistence-modifier="persistent"
            primary-key="true"/>
        <field name="set" persistence-modifier="persistent"
            embedded="false" default-fetch-group="false">
          <collection   element-type="PC1"   embedded-
              element="false"/>
        </field>
      </class>
    </package>
</jdo>
<map version="1.0">
    <package name="testjdo">
      <class name="PC1">
        <field name="key">
          <column name="KEY1" table="JDOTEST01"/>
        </field>
        <relationship-field name="set" multiplicity="many"
            join-table="true">
          <foreign-key
              name="JDOTESTJOIN_TO_JDOTEST01" for-
              eign-key-table="JDOTESTJOIN" primary-key-
              table="JDOTEST01">
            <column-pair  foreign-key-column="FKEY1_1"
                primary-key-column="KEY1"/>
          </foreign Key>
          <foreign-key
              name="JDOTESTJOIN_TO_JDOTEST02" for-
              eign-key-table="JDOTESTJOIN" primary-key-
              table="JDOTEST02">
            <column-pair  foreign-key-column="FKEY1_2"
                primary-key-column="KEY1"/>
          </foreignKey>
        </relationship-field>
      </class>
      <class name="PC2">
        <field name="key">
          <column name="KEY1" table="JDOTEST02"/>
        </field>
        <relationship-field name="set" multiplicity="many"
            join-table="true" update="false">
          <foreign-key
              name="JDOTESTJOIN_TO_JDOTEST02" for-
              eign-key-table="JDOTESTJOIN" primary-key-
              table="JDOTEST02">
            <column-pair  foreign-key-column="FKEY1_2"
                primary-key-column="KEY1"/>
          </foreignKey>
          <foreign-key
              name="JDOTESTJOIN_TO_JDOTEST01" for-
              eign-key-table="JDOTESTJOIN" primary-key-
              table="JDOTEST01">
            <column-pair  foreign-key-column="FKEY1_1"
                primary-key-column="KEY1"/>
          </foreignKey>
        </relationship-field>
      </class>
    </package>
</map>
```

Many-to-Many Unidirectional Relationships

The many-to-many unidirectional relationship differs from the many-to-many bidirectional relation by the missing field of set type on an arbitrary side. The relational model is the same as the relational model for many-to-many bidirectional relations. The mapping metadata for the remaining field of set type is the same as the mapping in the many-to-many bidirectional case. The property update should not be set to false.

One-to-One Bidirectional Relationships

In a one-to-one bidirectional relationship, there are corresponding fields of persistence capable class type on both sides of the relation. The field type is the type of the persistence capable class type of the other side. In the relational model, there is a foreign key on an arbitrary side. A unique constraint is provided for the foreign key column.

Figure 10:
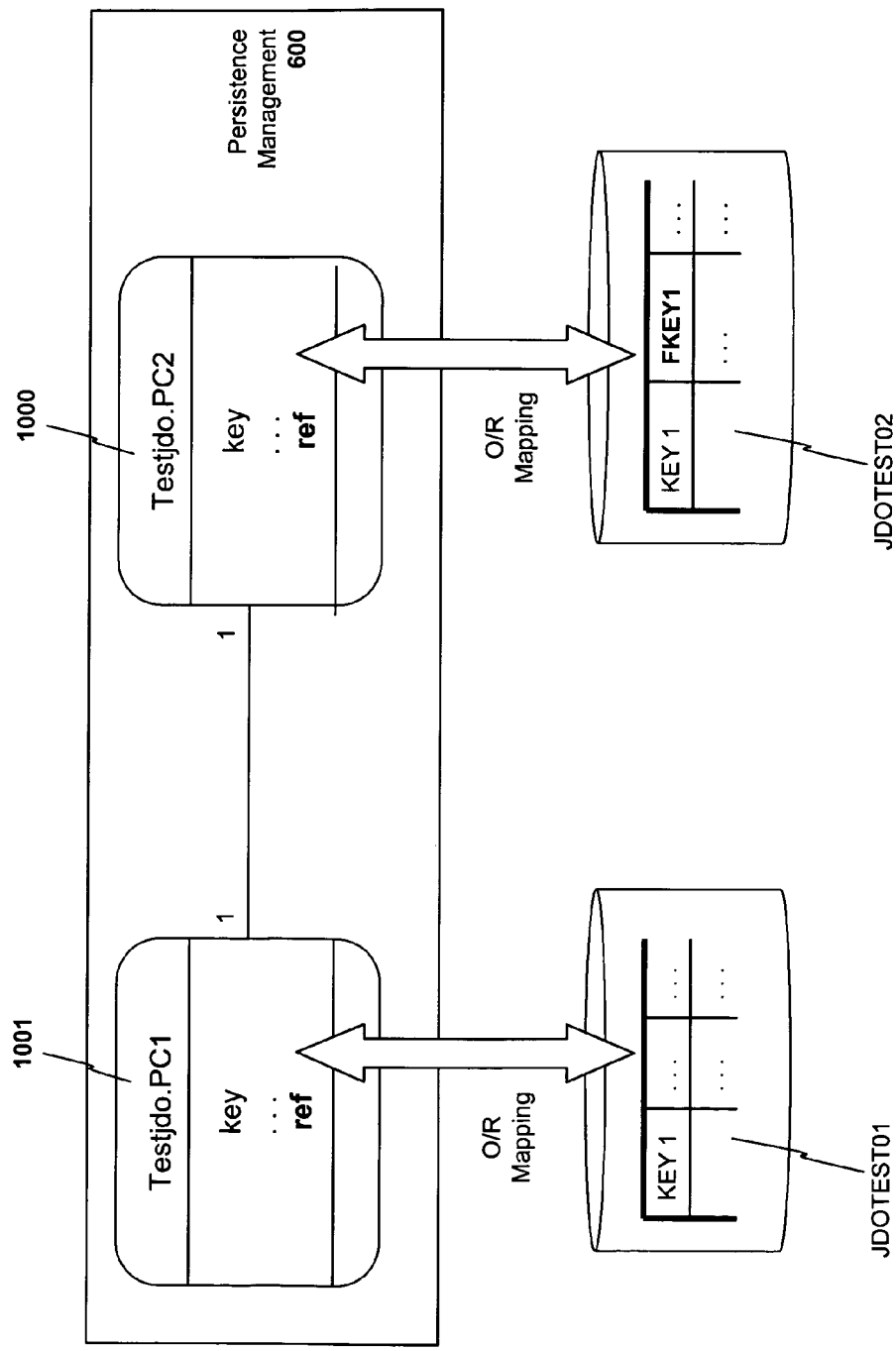
FIG. 10 illustrates a one-to-one bidirectional mapping employed in one embodiment of the invention.

FIG. 10 illustrates an example where there is one-to-one relationship between the class testjdo.PC1 (1001) and class testjdo.PC2 (1000). Both classes have a relationship field ref of persistence capable class type. The class testjdo.PC1 is mapped to table JDOTEST01, the class testjdo.PC2 is mapped to table JDOTEST02. In table JDOTEST02 there is a foreign key column FKEY1 with primary key column KEY1 in table JDOTEST01. In the mapping meta data there is a foreign-key element for both relationship field ref containing the same foreign key (identified by the foreign key name). The property update should be set to false for the relationship field not having the foreign key columns in its class's tables. In this example, this is the relationship field ref of class testjdo.PC1.

In one embodiment of the invention, the following persistence and mapping metadata may be employed to describe the foregoing relationships:

```
<jdo>
    <package name="testjdo">
      <class name="PC1" identity-type="application" objectid-
          class="PC1$PC1ID">
        <field name="key" persistence-modifier="persistent"
            primary-key="true"/>
        <field name="ref" persistence-modifier="persistent"
            embedded="false" default-fetch-group="false"/>
      </class>
      <class name="PC2" identity-type="application" objectid-
          class="PC2$PC2ID">
        <field name="key" persistence-modifier="persistent"
            primary-key="true"/>
        <field name="ref" persistence-modifier="persistent"
            embedded="false" default-fetch-group="false"/>
      </class>
    </package>
</jdo>
<map version="1.0">
    <package name="testjdo">
      <class name="PC1">
        <field name="key">
          <column name="KEY1" table="JDOTEST01"/>
        </field>
        <relationship-field  name="ref"  multiplicity="one"
            update="false">
          <foreign-key
              name="JDOTEST02_TO_JDOTEST01" foreign-
              key-table="JDOTEST02" primary-key-
              table="JDOTEST01">
            <column-pair foreign-key-column="FKEY1" pri-
                mary-key-column="KEY1"/>
          </foreignKey>
        </relationship-field>
      </class>
      <class name="PC2">
```

```
        <field name="key">
            <column name="KEY1" table="JDOTEST02"/>
        </field>
        <relationship-field name="ref" multiplicity="one">
            <foreign-key
                name="JDOTEST02_TO_JDOTEST01" foreign-
                key-table="JDOTEST02"        primary-key-
                table="JDOTEST01">
                <column-pair foreign-key-column="FKEY1" pri-
                    mary-key-column="KEY1"/>
            </foreignKey>
        </relationship-field>
    </class>
</package>
</map>
```

One-to-One Unidirectional Relationships

The one-to-one unidirectional relationship differs from the one-to-one bidirectional relation by the missing field of persistent capable class type on an arbitrary side. In the relational model, the foreign key may be on the same or on the other side as the remaining field of persistence capable class type, but it is more convenient to have the foreign key on the same side as the field of persistence capable class type. So, one-to-one relations with a foreign key on the other side are not supported. The property update must not be set to false.

Inverse and Managed Relationships

A relationship between two persistent capable classes is referred to as an "inverse," if there is a relationship field in both classes. As used herein, inverse is a synonym for bidirectional.

A relationship between two persistent capable classes is called "managed," if the referential integrity is guaranteed by the implementation. Therefore an inverse relation must be managed, but non-inverse relations can be managed too. For example, in a one-to-many-unidirectional relation, it must be guaranteed that two instances of a class with a field of set type do not have a common element, or else the relation is many-to-many.

Null Values

If foreign columns allow null values, then the values of corresponding fields in the object model may also be null or an empty set.

Foreign Key Constraints

Foreign key constraints ensure referential integrity of the data in the database. For each entry in a foreign column there must be a entry in the primary key columns of the corresponding table. In one embodiment of the invention, checks are performed by the database automatically.

With foreign key constraints, update operations (including insert, update and delete statement) may be performed in a special order. An entry in the foreign key columns can only be done if the same entry already exits in the corresponding primary key columns. If the object graph contains cycles, then inserting is done in two steps. In the first step, both entries are inserted with the foreign key columns set to null and in the second step, the foreign key columns are set. So, using foreign key constraints, there may be an ordering on the statement.

Multiset Semantics/Collections

Figure 11:
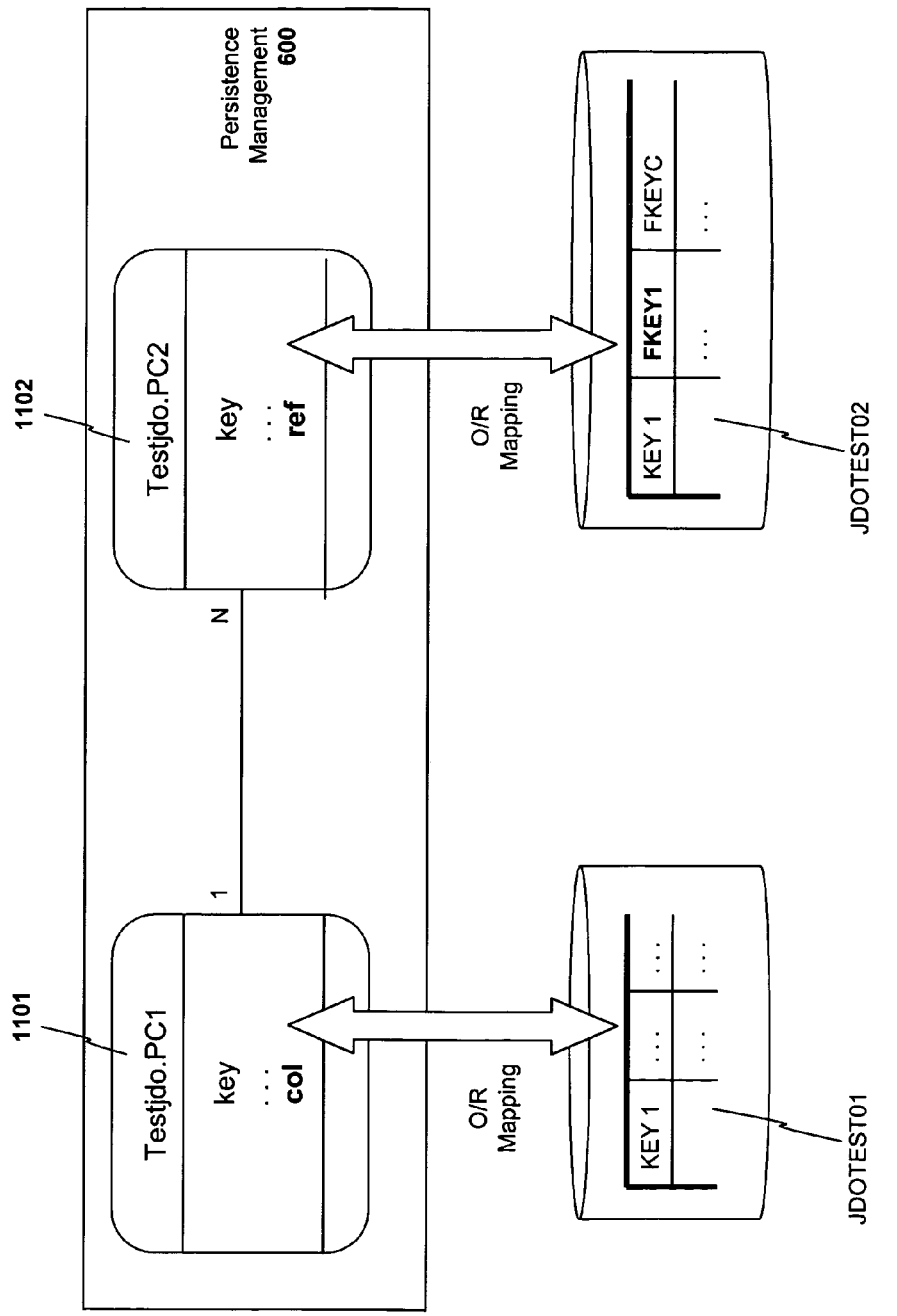
FIG. 11 illustrates an embodiment of the invention where there is one-to-many relationship between classes.

The sections above describe the object relational mapping for sets. For collections, a column for the number of duplicates may be added to the foreign key. FIG. 11 illustrates an example where there is one-to-many relationship between class testjdo.PC1 (1101) and class testjdo.PC2 (1102). The class testjdo.PC1 has a relationship field col of collection type containing elements of type testjdo.PC2. The class testjdo.PC2 has a relationship field ref of type testjdo.PC1. The class testjdo.PC1 is mapped to table JDOTEST01, the class testjdo.PC2 is mapped to table JDOTEST02. In table JDOTEST02 there is a foreign key column FKEY1 with primary key column KEY1 in table JDOTEST01 and a column FKEYC with the number of duplicates. In the mapping metadata, an example of which is provided below, there is a foreign-key element for the both relationship fields col and ref containing the same foreign key (identified by the foreign key name). In addition, the relationship-field element for col and ref both have a count element containing the column for the number of duplicates.

In one embodiment of the invention, the following persistence and mapping metadata may be employed to describe the foregoing relationships:

```
<jdo>
    <package name="testjdo">
        <class name="PC1" identity-type="application" objectid-
            class="PC1$PC1ID">
            <field name="key" persistence-modifier="persistent"
                primary-key="true"/>
            <field name="col" persistence-modifier="persistent"
                embedded="false" default-fetch-group="false">
                <collection    element-type="PC2"    embedded-
                    element="false"/>
            </field>
        </class>
        <class name="PC2" identity-type="application" objectid-
            class="PC2$PC2ID">
            <field name="key" persistence-modifier="persistent"
                primary-key="true"/>
            <field name="ref" persistence-modifier="persistent"
                embedded="false" default-fetch-group="false"/>
        </class>
    </package>
</jdo>
<map version="1.0">
    <package name="testjdo">
        <class name="PC1">
            <field name="key">
                <column name="KEY1" table="JDOTEST01"/>
            </field>
            <relationship-field name="col" multiplicity="many">
                <count>
                    <column                     name="FKEYC"
                        table="JDOTEST02"/>
                </count>
                <foreign-key
                    name="JDOTEST02_TO_JDOTEST01" foreign-
                    key-table="JDOTEST02"        primary-key-
                    table="JDOTEST01">
                    <column-pair foreign-key-column="FKEY1" pri-
                        mary-key-column="KEY1"/>
                </foreignKey>
            </relationship-field>
        </class>
        <class name="PC2">
            <field name="key">
                <column name="KEY1" table="JDOTEST02"/>
            </field>
            <relationship-field name="ref" multiplicity="one">
                <count>
                    <column                     name="FKEYC"
                        table="JDOTEST02"/>
```

```
        </count>
        <foreign-key
            name="JDOTEST02_TO_JDOTEST01" foreign-
            key-table="JDOTEST02"        primary-key-
            table="JDOTEST01">
            <column-pair foreign-key-column="FKEY1" pri-
                mary-key-column="KEY1"/>
        </foreign Key>
    </relationship-field>
</class>
</package>
</map>
```

Generic Relationship Fields

An persistent attribute of a persistent class (a class whose persistence is managed by a persistence manager) may be of a type that is not a primitive type and not a persistent class type (hereinafter referred to as a "generic" type). At runtime, the value of such an attribute may be an instance of a persistent class or an instance of a non-persistent class. In one embodiment of the invention, an O/R mapping pattern is defined to handle both of the foregoing cases. The O/R mapping pattern may also be employed for the elements of a collection (e.g., if the element type is generic).

As used herein, generic relationship fields are defined as follows:

(1) fields with non persistent class type like fields with interface type or fields with type Object; or (2) fields with collection interface types (e.g., java.util.Set and java.util.Collection) where the element type is not a persistent class type.

In one embodiment of the invention, an attribute of a persistent class with a generic type is mapped to a 3-tuple of the following columns (belonging to the table the persistent class is mapped to): a "discriminator" column; a "reference" column; and a "serialized-data" column.

Discriminator Column. If the value is an instance of a persistent class (e.g., a persistence capable class in a JDO implementation), this column holds the type of this value. Otherwise it is set to a NULL value.

Reference Column. If the value is an instance of a persistent class, this columns holds the key of this value in a serialized form (e.g., stored as a string). Otherwise it is set to a NULL value. The combination of the reference column and the discriminator column are referred to herein as a "generic persistent reference."

Serialized-Data Column. If the value is not an instance of a persistent class, then the value (including type information) is serialized and stored in a serialized data column, as described below. In this case, a null value may be stored to the associated discriminator and reference columns. In one embodiment, if the value is not serializable, it is not persisted.

In one embodiment, for collections with a generic element type, the values contained are mapped to the same 3-tuple of database columns within a join table. As mentioned above, for many-to-many relations join tables may be used to associate the primary keys of one persistent data object with the primary keys of a second persistent data object. In this embodiment, a row in the join table is provided for each value that is an instance of a persistent class. If there are values that are not instances of persistent classes, a single row in the join table is used containing the serialized collection of all these values.

In one embodiment of the invention, duplicate values in a collection, which are instances of a persistent class are handled by an additional "count" column in the join table. For example, if a duplicate value exists that is an instance of a persistent class, then the count column holds the number of occurrences of the duplicate value.

Generic relationship are not bidirectional. Relationships, for example, cannot be established between two interfaces. Thus, a generic relationship refers from a concrete persistent class (e.g., which might implement an interface) to a generic type.

The following are examples of how embodiments of invention may be implemented for specific types of generic relationships. It should be noted, however, that many of the specific details set forth below are not required for complying with the underlying principles of the invention.

Many-to-One Unidirectional Generic Relationships

A many-to-one generic unidirectional relationship has a field of object type, interface type or non-persistence-capable class type on the many side of the relationship. In the relational model, there is a generic persistent reference in the table corresponding to the class of the many side.

Figure 12:
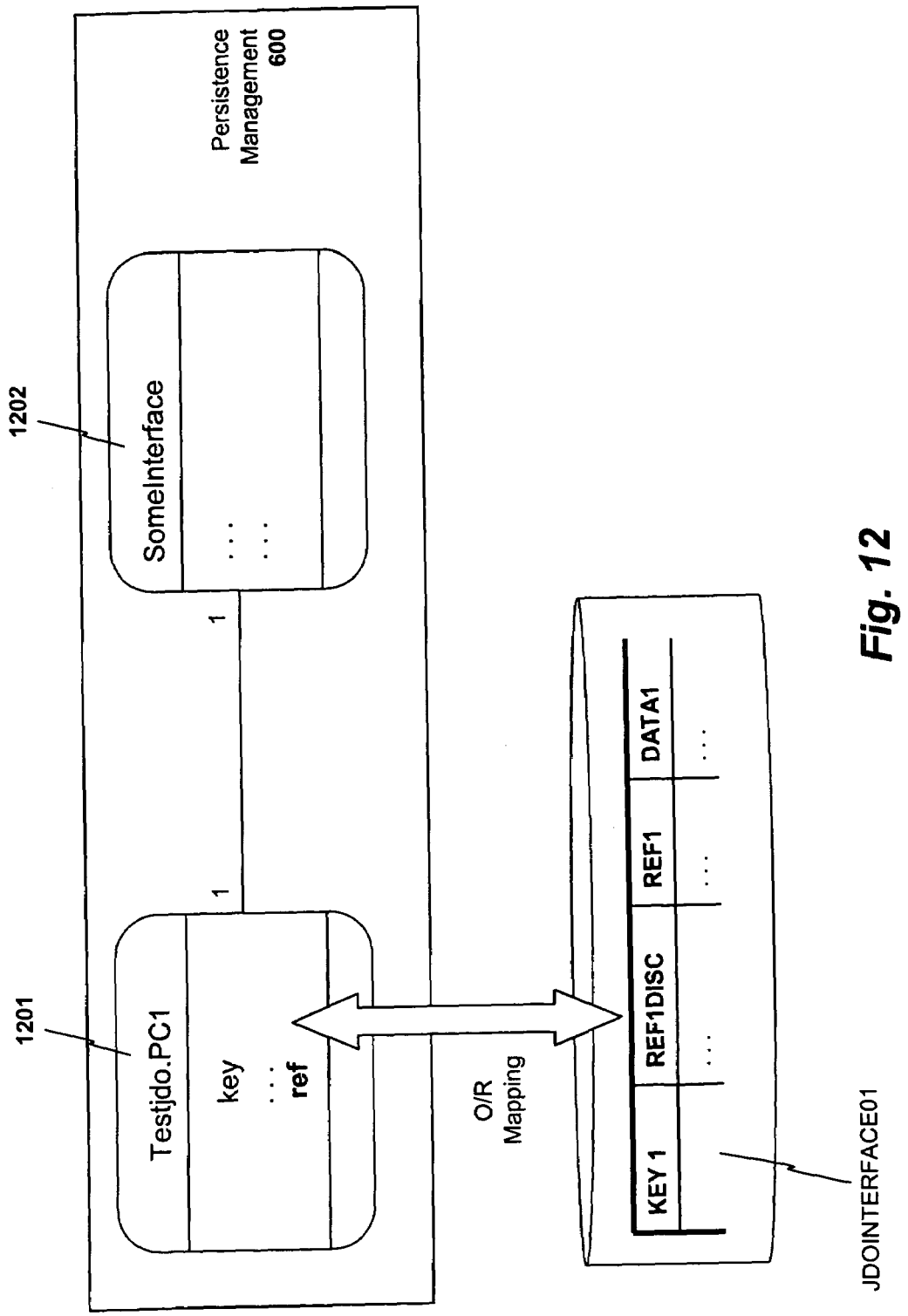
FIG. 12 illustrates one embodiment of the invention in which a class contains a reference to an interface.

FIG. 12 illustrates an example in which the class testjdo.PC1 (1201) contains the field ref with type testjdo.SomeInterface, referring to the interface "SomeInterface" (1202). As described more generally above, the field is mapped to the generic persistent reference consisting of the discriminator column REF1 DISC and reference column REF1 in table JDOINTERFACE1. More specifically, the discriminator column is provided with the type associated with the field and the reference column is provided with the serialized key of the field. Further, this field might be mapped to a third column DATA1 in table JDOINTERFACE1. This column is provided with the serialized value if this value is not an instance of a persistent class.

In one embodiment, the following persistence and mapping metadata are employed to describe the foregoing O/R mapping:

```
<jdo>
    <package name="testjdo">
    <class name="PC1" identity-type="application" objectid-
        class="PC1$PC1ID">
        <field name="key" persistence-modifier="persistent"
            primary-key="true"/>
        <field name="ref" persistence-modifier="persistent"
            embedded="false" default-fetch-group="false"/>
    </class>
    </package>
</jdo>
<map version="1.0">
    <package name="testjdo">
    <class name="PC1">
        <field name="key">
            <column name="KEY1" table="JDOTEST01"/>
        </field>
        <relationship-field name="ref" multiplicity="one">
            <discriminator>
                <column                    name="DISCREF1"
                    table="JDOINTERFACE1"/>
            </discriminator>
            <reference>
                <column                      name="REF1"
                    table="JDOINTERFACE1"/>
            </reference>
            <serialized-data>
                <column                     name="DATA1"
                    table="JDOINTERFACE1"/>
```

```
        </serialized-data>
      </relationship-field>
    </class>
  </package>
</map>
```

One-to-One Unidirectional Generic Relationships

A one-to-one unidirectional generic relationship is a many-to-one unidirectional generic relationship, if there is a unique index provided for the generic persistence reference columns.

Many-to-Many Unidirectional Generic Relationships

A many-to-many generic unidirectional relationship has a field of set type with an interface element type or object element type on one side of the relationship. In the relational model, there may be a generic persistent reference in a join table logically belonging to the class of the one side.

Figure 13:
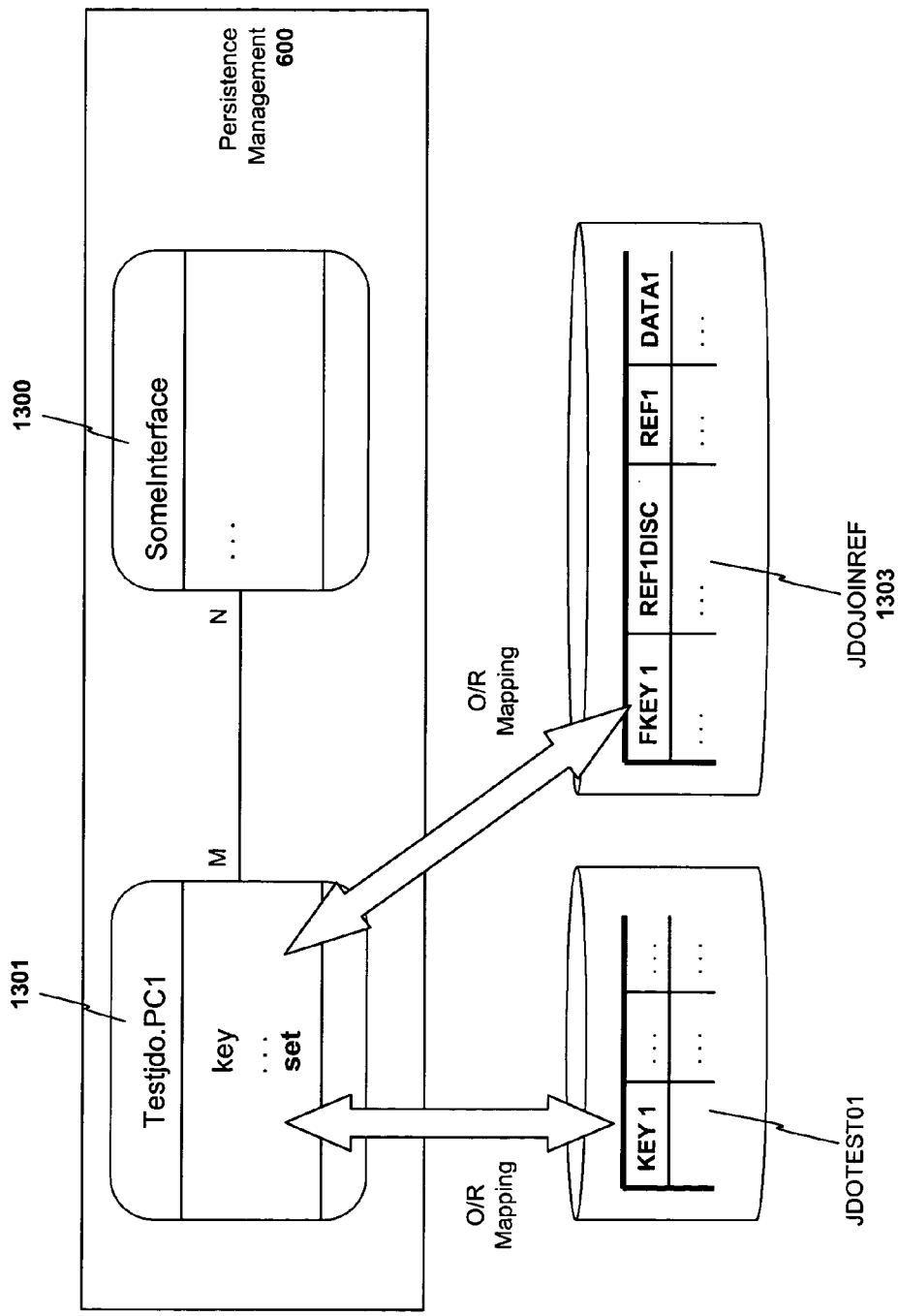
FIG. 13 illustrates one embodiment of the invention which employs a join table.

FIG. 13 illustrates an example in which a class testjdo.PC1 (1301) contains the field set with element type "testjdo.SomeInterface." A join table JDOJOINREF (1303) is provided with the foreign key column FKEY1 corresponding to the primary key column KEY1 in table JDOTEST01. The join table also contains a generic persistent reference consisting of a discriminator column REF1 DISC and a reference column REF1 for the discriminator and serialized values, respectively. Further the join table contains a column DATA1 for the serialized collection of all instances that are not instances of a persistence capable class.

In one embodiment, the following persistence and mapping metadata is employed to describe the foregoing O/R mapping:

```
<jdo>
  <package name="testjdo">
    <class name="PC1" identity-type="application" objectid-class="PC1$PC1ID">
      <field name="key" persistence-modifier="persistent" primary-key="true"/>
      <field name="set" persistence-modifier="persistent" embedded="false" default-fetch-group="false">
        <collection element-type="testjdo.SomeInterface" embedded-element="false"/>
      </field>
    </class>
  </package>
</jdo>

<map version="1.0">
  <package name="testjdo">
    <class name="PC1">
      <field name="key">
        <column name="KEY1" table="JDOTEST01"/>
      </field>
      <relationship-field name="set" multiplicity="many">
        <foreign-key name="JDOJOINREF_TO_JDOTEST01" foreign-key-table="JDOJOINREF" primary-key-table="JDOTEST01">
          <column-pair foreign-key-column="FKEY1" primary-key-column="KEY1"/>
        </foreign-key>
        <discriminator>
          <column name="REF1 DISC" table="JDOJOINREF"/>
        </discriminator>
        <reference>
          <column name="REF1" table="JDOJOINREF"/>
        </reference>
        <serialized-data>
          <column name="DATA1" table="JDOJOINREF"/>
        </serialized-data>
      </relationship-field>
    </class>
  </package>
</map>
```

One-to-Many Unidirectional Generic Relationships

A one-to-many unidirectional generic relationship is a many-to-many unidirectional generic relationship if there is a unique index on the generic persistence reference columns. This only applies to instances of persistent capable classes.

For the purpose of illustration, FIG. 14 illustrates a mapping between several of the columns described above and JDBC types. It should be noted, however, that the underlying principles of the invention are not limited to JDBC.

Embodiments of the invention may include various steps as set forth above. The steps may be embodied in machine-executable instructions which cause a general-purpose or special-purpose machine, such as a computer processor or virtual machine, to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, flash memory, optical disks, CD-ROMs, DVD ROMs, RAMs, EPROMs, EEPROMs, magnetic or optical cards, or other type of machine-readable media suitable for storing electronic instructions.

Throughout the foregoing description, for the purposes of explanation, numerous specific details were set forth in order to provide a thorough understanding of the invention. It will be apparent, however, to one skilled in the art that the invention may be practiced without some of these specific details. For example, while the embodiments of the invention described above focus on the Java environment and, more specifically, on a JDO implementation, the underlying principles of the invention may be employed in virtually any environment in which relational database data is mapped to an object-oriented representation of the relational database data. In certain examples set forth above, the term "persistence capable type" may be used instead of "persistent class type" and "persistence capable class" may be used instead of "persistent class." Once again, the foregoing JDO-specific terms should not be read to limit the scope of the underlying principles of the invention to a strict JDO implementation. Alternate enterprise environments in which the embodiments of the invention may be practiced include, but are not limited to J2EE, the Microsoft .NET framework, and the Advanced Business Application Programming ("ABAP") standard developed by SAP AG.

Accordingly, the scope and spirit of the invention should be judged in terms of the claims which follow.

What is claimed is:

1. A method, comprising:
   processing program code with a computer processor to perform the following:
      determining whether a value of an attribute having an interface type that is not a primitive type and not a persistent class type is an instance of a persistent class, the attribute corresponding to a reference to an interface;

if the value is an instance of a persistent class, mapping the attribute to a discriminator column and a reference column within a database, the discriminator column holding the interface type associated with the attribute, the reference column holding a key associated with the value;

if the value is not an instance of a persistent class, serializing and storing the value into a serialized-data column within the database;

determining whether a second value of a second attribute having an Object type that is not a primitive type and not a persistent class type is an instance of a persistent class, the second attribute corresponding to a reference to an object;

if the second value is an instance of a persistent class, mapping the second attribute to the discriminator column and the reference column within the database, the discriminator column holding the object type associated with the second attribute, the reference column holding a second key associated with the second value;

if the second value is not an instance of a persistent class, serializing and storing the second value into the serialized-data column within the database;

determining whether a third value of a third attribute having a collection interface type that is not a primitive type and not a persistent class type is an instance of a persistent class, the third attribute corresponding to a set of an M to N relationship;

if the third value is an instance of a persistent class, mapping the third attribute to a second discriminator column and a second reference column within a join table, the second discriminator column holding the collection interface type associated with the third attribute, the second reference column holding a third key associated with the third value;

if the third value is not an instance of a persistent class, serializing and storing the third value into a second serialized-data column within the join table that holds serialized values of additional attributes of non persisted classes other than said third value's class.

2. The method as in claim 1 further comprising:

if the value is not an instance of a persistent class, then setting a metadata representation of the discriminator column and the reference column to a null value.

3. The method as in claim 1 wherein the attribute, the second attribute and the third attribute are within different Java Data Object ("JDO")-compliant data objects.

4. The method as in claim 3 wherein the database is a relational database and each of the mappings is an object-relational (O/R) mapping.

5. The method as in claim 1 wherein each of the mappings is performed within a Java 2 Enterprise Edition ("J2EE") environment.

6. A machine-readable storage medium having program code stored thereon that when processed by a computer processor causes a method to be performed, the method comprising:

determining whether a value of an attribute having an interface type that is not a primitive type and not a persistent class type is an instance of a persistent class, the attribute corresponding to a reference to an interface;

if the value is an instance of a persistent class, mapping the attribute to a discriminator column and a reference column within a database, the discriminator column holding the interface type associated with the attribute, the reference column holding a key associated with the value;

if the value is not an instance of a persistent class, serializing and storing the value into a serialized-data column within the database;

determining whether a second value of a second attribute having an object type that is not a primitive type and not a persistent class type is an instance of a persistent class, the second attribute corresponding to a reference to an object;

if the second value is an instance of a persistent class, mapping the second attribute to the discriminator column and the reference column within the database, the discriminator column holding the object type associated with the second attribute, the reference column holding a second key associated with the second value;

if the second value is not an instance of a persistent class, serializing and storing the second value into the serialized-data column within the database;

determining whether a third value of a third attribute having a collection interface type that is not a primitive type and not a persistent class type is an instance of a persistent class, the third attribute corresponding to a set of an M to N relationship;

if the third value is an instance of a persistent class, mapping the third attribute to a second discriminator column and a second reference column within a join table, the second discriminator column holding the collection interface type associated with the third attribute, the second reference column holding a third key associated with the third value;

if the third value is not an instance of a persistent class, serializing and storing the third value into a second serialized-data column within the join table that holds serialized values of additional attributes of non persisted classes other than said third value's class.

7. The machine-readable storage medium as in claim 6 comprising additional program code to cause the computer processor to perform the operations of:

if the value is not an instance of a persistent class, then setting a metadata representation of the discriminator column and the reference column to a null value.

8. The machine-readable storage medium as in claim 6 wherein the attribute, the second attribute and the third attribute are within different Java Data Object ("JDO")-compliant data objects.

9. The machine-readable storage medium as in claim 8 wherein the database is a relational database and each of the mappings is an object-relational (O/R) mapping.

10. The machine-readable storage medium as in claim 6 wherein each of the mappings is performed within a Java 2 Enterprise Edition ("J2EE") environment.

11. A computer comprising a processor and a machine readable storage medium containing program code, wherein, when said program code is processed by said processor, a method is performed, said method comprising:

determining whether a value of an attribute having an interface type that is not a primitive type and not a persistent class type is an instance of a persistent class, the attribute corresponding to a reference to an interface;

if the value is an instance of a persistent class, mapping the attribute to a discriminator column and a reference column within a database, the discriminator column holding the interface type associated with the attribute, the reference column holding a key associated with the;

if the value is not an instance of a persistent class, serializing and storing the value into a serialized-data column within the database;

determining whether a second value of a second attribute having an object type that is not a primitive type and not a persistent class type is an instance of a persistent class, the second attribute corresponding to a reference to an object;

if the second value is an instance of a persistent class, mapping the second attribute to the discriminator column and the reference column within the database, the discriminator column holding the object type associated with the second attribute, the reference column holding a second key associated with the second value;

if the second value is not an instance of a persistent class, serializing and storing the second value into the serialized-data column within the database;

determining whether a third value of a third attribute having a collection interface type that is not a primitive type and not a persistent class type is an instance of a persistent class, the third attribute corresponding to a set of an M to N relationship;

if the third value is an instance of a persistent class, mapping the third attribute to a second discriminator column and a second reference column within a join table, the second discriminator column holding the collection interface type associated with the third attribute, the second reference column holding a third key associated with the third value;

if the third value is not an instance of a persistent class, serializing and storing the third value into a second serialized-data column within the join table that holds serialized values of additional attributes of non persisted classes other than said third value's class.

12. The computer of claim 11 wherein the program code includes additional program code to cause the machine to perform the operations of:

if the attribute's value is not an instance of a persistent class, then setting a metadata representation of the discriminator column and the reference column to a null value.

13. The computer of claim 11 wherein the attribute, the second attribute and the third attribute are within different Java Data Object ("JDO")-compliant data objects.

14. The computer of claim 11 wherein the database is a relational database and the mapping is an object-relational (O/R) mapping.

15. The computer of claim 11 wherein the mapping is performed within a Java 2 Enterprise Edition ("J2EE") environment.

16. The computer of claim 11 wherein said method further comprises placing a unique index within the reference column of the database to effect a many-to-one unidirectional relationship from a one-to-one unidirectional relationship implemented with said reference to an object.

17. The computer of claim 16 wherein said method further comprises placing a unique index within the reference column of the join table to effect a one-to-many unidirectional relationship from the M to N relationship.

* * * * *